(12) United States Patent
Yamamoto

(10) Patent No.: US 8,947,792 B2
(45) Date of Patent: Feb. 3, 2015

(54) PROJECTION LENS AND PROJECTION-TYPE DISPLAY APPARATUS USING THE LENS

(71) Applicant: FUJIFILM Corporation, Tokyo (JP)

(72) Inventor: Chikara Yamamoto, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/054,864

(22) Filed: Oct. 16, 2013

(65) Prior Publication Data

US 2014/0043690 A1 Feb. 13, 2014

Related U.S. Application Data

(63) Continuation of application No. PCT/JP2012/002537, filed on Apr. 12, 2012.

(30) Foreign Application Priority Data

Apr. 19, 2011 (JP) .................................. 2011-092720

(51) Int. Cl.
*G02B 9/34* (2006.01)
*G02B 13/22* (2006.01)
*G02B 13/18* (2006.01)

(52) U.S. Cl.
CPC *G02B 9/34* (2013.01); *G02B 13/18* (2013.01); *G02B 13/22* (2013.01)
USPC .......................................... 359/774; 359/715

(58) Field of Classification Search
CPC ................................. G02B 9/34; G02B 13/004
USPC .................. 359/650, 715, 771, 774
See application file for complete search history.

(56) References Cited

U.S. PATENT DOCUMENTS

| 7,885,009 | B2 | 2/2011 | Baba et al. |
| 2010/0053774 | A1 | 3/2010 | Baba et al. |
| 2010/0315598 | A1 | 12/2010 | Yamamoto |
| 2011/0267586 | A1* | 11/2011 | Tsai et al. ........................ 353/20 |
| 2013/0163097 | A1* | 6/2013 | Hsiung et al. ................. 359/715 |

FOREIGN PATENT DOCUMENTS

| JP | 1-309014 | 12/1989 |
| JP | 2-44308 | 2/1990 |

(Continued)

OTHER PUBLICATIONS

International Search Report PCT/JP2012/002537 dated Aug. 21, 2012, with English translation.

*Primary Examiner* — Darryl J Collins
(74) *Attorney, Agent, or Firm* — Young & Thompson

(57) ABSTRACT

To provide a projection lens that is compact, lightweight, low-cost, and readily portable, a first lens having a positive power and at least one surface that is an aspheric surface; a second lens having a negative power and having a concave surface on the magnification side; a third lens having a positive power and having a convex surface on the reduction side; and a fourth lens having a positive power are arranged in order from the magnification side. In addition to arranging the lenses telecentrically on the reduction side, the following formulas are satisfied simultaneously, and images formed on the conjugation surface on the reduction side are enlarged and projected on the conjugation surface on the magnification side: formula (A) 0.8<Bf/f; formula (B) 1.1<f1/f<1.6; formula (C) Nd1<1.7, formula (D) vd1<35.

20 Claims, 5 Drawing Sheets

(56) References Cited

FOREIGN PATENT DOCUMENTS

| JP | 6-160707 | 6/1994 |
| JP | 2004-361651 | 12/2004 |
| JP | 2010-079252 | 4/2010 |
| JP | 2010-097078 | 4/2010 |
| JP | 2010-175832 | 8/2010 |
| JP | 3165336 | 12/2010 |
| JP | 2011-002518 | 1/2011 |
| JP | 2011-237758 | 11/2011 |
| JP | 2012-027420 | 2/2012 |

* cited by examiner

EXAMPLE 1

EXAMPLE 2

EXAMPLE 3

PROJECTION LENS AND PROJECTION-TYPE DISPLAY APPARATUS USING THE LENS

BACKGROUND OF THE INVENTION

1. Field of the Invention

The present invention relates to a projection lens for enlarging and projecting images formed on a conjugation surface on a reduction side onto a conjugation surface on a magnification side and a projection-type display apparatus using the lens.

2. Description of the Related Art

A transmissive/reflective light valve using liquid crystal and the like, a small projection lens using DMD's that modulate light by deflecting arranged micro mirrors, as well as a projection-type display apparatus (also called projectors) using the lens are conventionally known.

In recent years, the market for such projectors has expanded along with the popularization of personal computers, light valves have been miniaturized, and light sources have been made more highly efficient. Such background requires commercialization of readily portable compact projectors.

As a projection lens constituting such readily portable projectors, a projection lens which has a reduced number of constituent lenses are particularly known (refer to Japanese Unexamined Patent Publication No. 2004-361651, Japanese Unexamined Patent Publication No. 2010-097078, and Japanese Unexamined Patent Publication No. 2010-175832).

SUMMARY OF THE INVENTION

However, the projector disclosed in Japanese Unexamined Patent Publication No. 2004-361651 has a small angle of view, between 25° and 30°, so that the size of projection images projected from a short distance is not sufficiently large. Further, sufficient spaces (back focus on the reduction side of the projection lens) for color composition and separation of illumination light from projection light are not secured. In addition, the sizes of light valves should be small given the importance of portability. However, there is a problem that this point is not considered.

Further, the projection lenses disclosed in Japanese Unexamined Patent Publication No. 2010-097078 and Japanese Unexamined Patent Publication No. 2010-475832 are known as projection lenses in which the angle of view or back focus is improved. However, in these projection lenses, sufficient considerations are not given to the aspherizing of a first lens, which is important for downsizing and brightening the lens. More particularly, low-cost, reduction in weight, and the like are not sufficiently considered with respect to asphering of the first lens, for example. Moreover, the angle of inclination of a representative ray of light (bisector of an angle to be described later) on a telecentric reduction side with respect to an optical axis is between 11° and 15°, so that the telecentric characteristic thereof is not sufficient in Japanese Unexamined Patent Publication No. 2010-097078.

It should be noted that the expression "the reduction side is telecentric" represents a state in which in rays of light emitted from an arbitrary optional point on the conjugation surface on the reduction side to be converged on the conjugation surface on the magnification side, a line bisecting the angle of each cross-section of rays of light emitted from the conjugation surface of the reduction side is nearly parallel to the optical axis. Accordingly, a true telecentric state is not limited to a state in which the above line bisecting the angle is completely parallel to the optical axis, and includes a state in which some difference may be present. Here, some difference means that the inclination of the bisecting line with respect to the optical axis is within the range of ±5°.

The above cross-section of the rays of light is a cross-section which is cut along a plane passing through the optical axis. The line bisecting the angle is a bisecting line which divides an angle of divergence at each cross-section of the rays of light emitted from the conjugation surface on the reduction side, into two equal angles.

In view of the foregoing circumstances, it is an object of the present invention to provide a projection lens telecentrically arranged on the reduction side, which is compact, lightweight, low-cost, and readily portable, as well as a projection-type display apparatus using the lens.

The projection lens according to the present invention is a projection lens which is telecentric on a reduction side, which enlarges and projects images formed on a conjugation surface on the reduction side onto a conjugation surface on a magnification side, only including:

a first lens having a positive power and at least one surface that is an aspheric surface;

a second lens having a negative power and having a concave surface on the magnification side;

a third lens having a positive power and having a convex surface on the reduction side; and a fourth lens having a positive power, which are arranged in order from the magnification side, wherein the following formulas (A), (B), (C), and (D) are simultaneously satisfied:

$$0.8 < Bf/f \quad (A);$$

$$1.1 < f1/f < 1.6 \quad (B);$$

$$Nd1 < 1.7 \quad (C); \text{ and}$$

$$vd1 < 35 \quad (D), \text{ where}$$

Bf: air conversion back focus on the reduction side
f: focal length of the entire lens system
f1: focal length of the first lens
Nd1: refractive index with respect to the d-line of the first lens, and
vd1: Abbe number based on the d-line of the first lens.

It is desirable for the fourth lens to have at least one surface that is an aspheric surface and the contour of the outer periphery of the fourth lens is non-circular in shape, and the following formulas (E) and (F) are satisfied at the same time:

$$Nd4 < 1.6 \quad (E); \text{ and}$$

$$40 < vd4 \quad (F).$$

In this case, Nd4 is the refractive index, and vd4 is the Abbe number based on the d-line of the fourth lens.

It is desirable for the projection lens to be provided with an aperture which restricts the range through which rays of light emitted from the conjugation surface on the reduction side pass therethrough, between the first lens and the second lens.

It is desirable for the projection lens so satisfy the following formulas (G) and (H) at the same time:

$$20 < S/OBJ < 65 \quad (G); \text{ and}$$

$$2.5 < \beta/S < 10.0 \quad (H), \text{ where}$$

S is the maximum length (in inches) of images (projection images) to be projected onto the conjugation surface on the magnification side, OBJ is a projection distance (m) to images (projection images) to be projected onto the conjugation surface on the magnification side, and $\beta$ is magnification factor of images (projection images) to be projected onto the conjugation surface on the magnification side.

It is desirable for the projection lens so satisfy the following formula (I):

$$IH > TH \quad (I),\text{ where}$$

IH is the maximum height of light beams on the conjugation surface on the reduction side, TH is the maximum height of effective rays of light of lenses other than the lens arranged closest to the reduction side.

The projection-type display apparatus according to the present invention includes a light source, a light valve, an illumination optical unit which guides the rays of light emitted from the light source to the light valve, and the projection lens described above, that optically modulates the rays of light emitted from the light source and passes the optically modulated rays of light through the projection lens to he projected.

The projection-type display apparatus may be a single panel type which includes only a single light valve.

The projection lens according to the present invention only includes:

a first lens having a positive power and at least one surface that is an aspheric surface;

a second lens having a negative power and having a concave surface on the magnification side;

a third lens having a positive power and having a convex surface on the reduction side; and a fourth lens having a positive power, which are arranged in order from the magnification side, wherein the reduction side is telecentric, and the following formulas (A), (B), (C), and (D) are simultaneously satisfied:

$$0.8 < Bf/f \quad (A);$$

$$1.1 < f1/f < 1.6 \quad (B);$$

$$Nd1 < 1.7 \quad (C);\text{ and}$$

$$vd1 < 35 \quad (D).$$

This allows the projection lens so be compact, lightweight, low-cost, and readily portable.

That is, formula (A): $0.8 < Bf/f$ regulates back focus. If the above projection lens is constructed so as to satisfy formula (A), the back focus on the reduction side can be secured, and thereby facilitates separation of the illumination light from the projection light, composition of light which represents colors different from one another, and the like.

Formula (B): $1.1 < f1/f < 1.6$ regulates a ratio of the focal length of the first lens with respect to the focal length of the entire lens system. If the above projection lens is constructed so as to satisfy formula (B), the performance of the lens cannot be degraded by the increased power of a lens arranged on the magnification side. In contrast, if the value of f1/f is lower than the lower limit defined by formula (B), it becomes difficult to secure the back focus on the reduction side and to correct aberrations.

Formula (C): $Nd1 < 1.7$ regulates the refractive index of the first lens. If the above projection lens is constructed in such a manner that the value of Nd1 exceeds the upper limit defined by formula (C), it becomes difficult to apply a plastic lens as the first lens, and thus achieving low-cost and light weight for this projection lens will be difficult.

Formula (D): $vd1 < 35$ regulates the Abbe number of the first lens. If the projection lens is constructed in such a manner that the value of vd1 exceeds the upper limit defined by formula (D), it becomes difficult to correct color aberration.

In view of the above-described circumstances, the projection lens according to the present invention can be telecentric on the reduction aide and can be compact, lightweight, low-cost, and readily portable without reducing the optical performance.

Further, the projection-type display apparatus according to the present invention can be compact, lightweight, low-cost, and readily portable by using the projection lens of the present invention as described above.

DESCRIPTION OF THE PREFERRED EMBODIMENTS

Hereinafter, the projection lens and projection-type display apparatus using the lens of the present invention will be described with reference to drawings.

Figure 1:
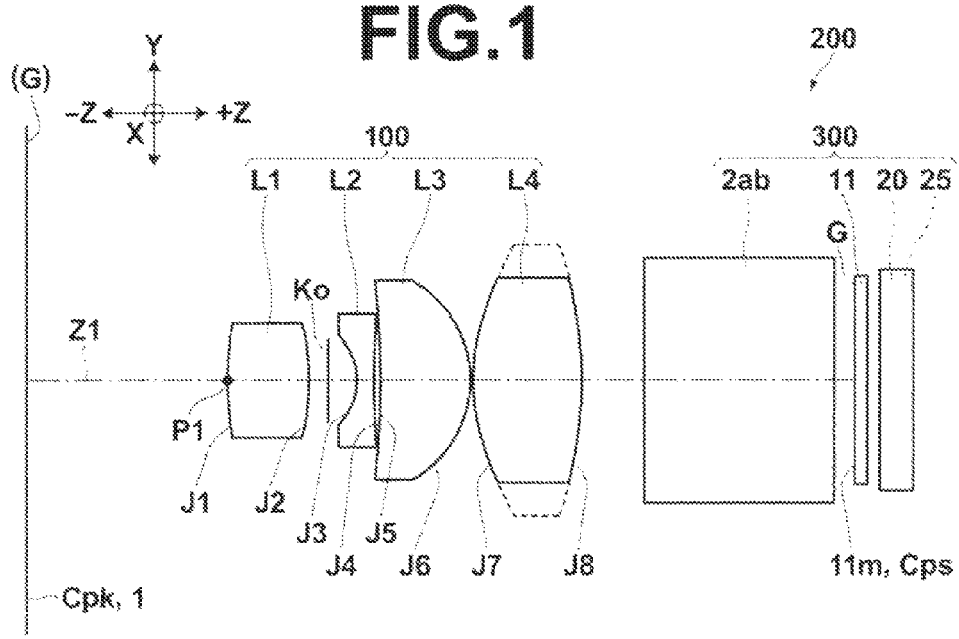
FIG. 1 is a schematic cross sectional diagram illustrating the structure of a projection lens according to an embodiment of the present invention.

FIG. 1 is a schematic cross sectional diagram illustrating the structure of the projection lens and projection-type display apparatus using this projection lens of the present invention.

The projection lens 100 of the present invention as shown in FIG. 1 is a compact projection lens that enlarges and projects an image (image information) G formed on a conjugation surface (conjugation position) Cps (i.e., on an image-forming surface 11m of a light valve 11 which is a display element) on a reduction side, onto a conjugation surface (conjugation position) Cpk (i.e., on a screen 1) on a magnification side.

This projection lens 100 includes only four lenses, which are: a first lens L1 having a positive power and at least one surface (i.e., either one of a lens surface J1 or a lens surface J2) that is an aspheric surface; a second lens L2 having a negative power and having a lens surface J3 which is concave surface on the magnification side; a third lens L3 having a positive power and having a lens surface J6 which is a convex surface on the reduction side; and a fourth lens L4 having a positive power, which are arranged in order from the magnification side (the side indicated by the direction of arrow −Z in FIG. 1).

The projection lens 100 is telecentrically arranged on the reduction side, and further satisfies the following formulas (A), (B), (C), and (D) at the same time:

$$0.8 < Bf/f \quad (A);$$

$$1.1 < f1/f < 1.6 \quad (B);$$

$$Nd1 < 1.7 \quad (C); \text{ and}$$

$$vd1 < 35 \quad (D), \text{ where}$$

Bf: air conversion back focus on the reduction side in the projection lens 100 f: focal length of the entire lens system of the projection lens 100 f1: focal length of the first lens L1

Nd1: refractive index with respect to the d-line of the first lens L1, and vd1: Abbe number based on the d-line of the first lens L1.

The air conversion back focus is defined by air conversion of the thicknesses of optical elements such as a filter, a cover glass and the like, in the case that the optical elements are arranged between a lens surface on the most reduction side and the conjugation surface on the reduction side.

It is desirable for the projection lens 100 to satisfy the following formula (B') which further limits the range defined by formula (B): 1.1<f1/f<1.6:

$$1.2 < f1/f < 1.5 \quad (B').$$

Further, it is also desirable for the projection lens 100 to satisfy the following formula (D') which further limits the range defined by formula (D): vd1<35:

$$vd1 < 30 \quad (D').$$

The projection lens 100 may be that which satisfies the following formula (A') or formula (C') or formula (D"):

$$0.8 < Bf/f < 1.2 \quad (A');$$

$$1.5 < Nd1 < 1.7 \quad (C'); \text{ and}$$

$$17 < vd1 < 35 \quad (D").$$

The fourth lens L4 may have at least one surface (either one of a lens surface J7 or a lens surface J8) that is an aspheric surface and the contour of the outer periphery of the fourth lens may be of a non-circular shape, and the following formulas (E) and (F) are satisfied at the same time:

$$Nd4 < 1.6 \quad (E); \text{ and}$$

$$40 < vd4 \quad (F).$$

In this case, Nd4 is the refractive index with respect to the d-line of the fourth lens L4, and vd4 is Abbe number based on the d-line of the fourth lens L4.

It is desirable for this fourth lens L4 to satisfy the following formula (F') which further limits the range defined by formula (F): 40<vd4:

$$50 < vd4 \quad (F').$$

Further, the fourth lens L4 may satisfy the following formula (E') or (F"):

$$1.4 < Nd4 < 1.6 \quad (E'); \text{ or}$$

$$40 < vd4 < 85 \quad (F").$$

In this case, the expression "the contour of the outer periphery of the fourth lens is of a non-circular shape" means various shapes which are different from the circular shape of a lens viewed from the direction of an optical axis Z1. Thus, the expression "lens has a non-circular shape" means that the shape of a lens viewed from the direction of the optical axis Z1 is not circular.

Figure 9A:
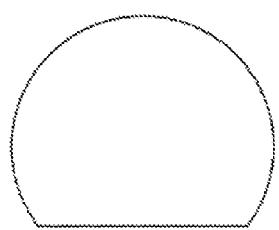
FIG. 9A is a diagram illustrating an example of a non-circular shape.
Figure 9A:
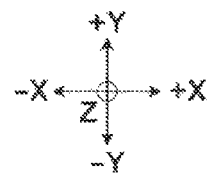
Figure 9B:
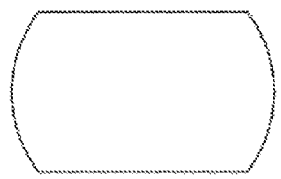
FIG. 9B is a diagram illustrating an example of a non-circular shape.
Figure 9B:
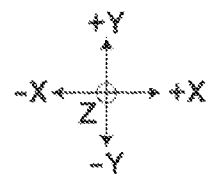
Figure 9C:
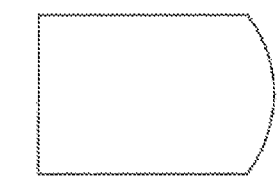
FIG. 9C is a diagram illustrating an example of a non-circular shape.
Figure 9C:
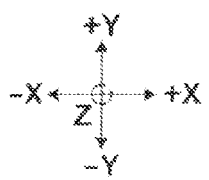

Examples of the above non-circular shape are shown in FIGS. 9A, 9B, and 9C. For example, the non-circular shape may include a shape in which one arcuate region (a region positioned in a −Y direction) is trimmed from the circular shape of a lens viewed from the direction of the optical axis Z1, i.e., which is cut in a D shape (see non-circular shape as shown in FIG. 9A); a shape in which two arcuate regions opposing to each other in Y directions are trimmed from the circular shape (see the non-circular shape as shown in FIG. 9B); and a shape in which one arcuate region (a region positioned in a −X direction) is further trimmed from the shape shown in FIG. 9B (see the non-circular shape as shown in FIG. 9C).

The region indicated by a dashed line in the fourth lens L4 of FIG. 1 refers to portions (two arcuate regions opposing to each other in Y directions) which are to be trimmed to form a non-circular shape as in the non-circular shape of FIG. 9B above.

In such a manner, the fourth lens L4 is formed in a non-circular shape including effective rays of light passing region in such a manner that no unnecessary portions (through which no effective rays of light pass) of the fourth lens L4, in which the maximum height of the effective rays of light is highest, are included. This can prevent the outer diameter of a lens from becoming too big.

An opening portion Ko having an aperture for restricting the range through which rays of light emitted from the conjugation surface Cps on the reduction side pass may be arranged between the first lens L1 and the second lens L2. Providing such an aperture can improve the terelectric characteristic on the reduction side.

The "aperture" needs only to have the function of restricting the passage of the rays of light, and may include an adjustable diaphragm.

The projection lens 100 can satisfy the following formulas (G) and (H) at the same time:

$$20 < S/OBJ < 65 \quad (G); \text{ and}$$

$$2.5 < \beta/S < 10.0 \quad (H), \text{ where}$$

S is the maximum length (inch) of images G to be projected onto the conjugation surface Cpk on the magnification side, OBJ is a projection distance (m) of images G to be projected onto the conjugation surface Cpk on the magnification side, and β is a magnification factor of images G to be projected onto the conjugation surface Cpk on the magnification side.

In this case, the expression "maximum length" refers to a length between two points where a space is the largest within a projection region on the conjugation surface Cpk on the magnification side, onto which the image G is projected. For example, in the case that an image G to be projected onto the conjugation surface Cpk is a rectangle or a square, the maximum length is defined as the length of the diagonal line.

Further, the projection distance of the image G is a distance from the center of the lens P1 (an intersection point of the lens surface J1 and the optical axis Z1) in the lens surface J1 on the magnification side of the first lens L1, which is arranged in the most magnification side, to the conjugation surface Cpk on the magnification side.

Further, it is desirable for the projection lens 100 to satisfy the following formula (I):

$$IH > TH \quad (I),$$ where

IH is the maximum height of an image for the image G formed on the conjugation surface Cps on the reduction side, TH is the maximum height of the effective rays of light for lenses other than the fourth lens arranged on the most reduction side.

In this case, the maximum height of the effective rays of light for lenses other than the fourth lens is the maximum value of the effective rays of light (a distance from the optical axis Z1) passing through the third lens L3, the second lens L2, and the first lens L1, which are lenses other than the fourth lens.

The technical significances of each of the above formulas will be described below. However, descriptions of formulas (A) through (D) will be omitted because they have already been explained above. Accordingly, only formulas (E) through (I) will be described.

Formula (E): Nd4<1.6 regulates the refractive index with respect to the d-line of the fourth lens L4. If the value of Nd4 exceeds the upper limit defined by formula (E), it becomes difficult to apply a plastic lens to the fourth lens L4. This will make achieving low-cost and light weight of the projection lens 100 and the projection-type display apparatus 200 difficult.

Formula (F): 40<vd4 regulates the Abbe number based on the d-line of the fourth lens. If the value of vd4 is lower than the lower limit defined by formula (F), it will become difficult to correct chromatic aberration.

Formula (G): 20<S/OBJ<65 regulates the size of a projection image with respect to the projection distance. If the projection lens 100 is constructed in such a manner that the value of S/OBJ deviates from the range defined by formula (G), it becomes difficult to perform projection so as to satisfy an appropriate size of a projection image and an appropriate projection distance, Formula (H): 2.5<β/S<10.0 regulates a ratio of the size of the projection image with respect to a magnification factor of the projection image. Formula (H) is satisfied so as to improve the illumination efficiency and realize the high-definition of a screen while suppressing an increase in the size of an apparatus to a large size.

Formula (I): IH>TH regulates the maximum height of the effective rays of light. If formula (I) is not satisfied, the probability of forming the third lens L3, the second lens L2, and the first lens L1 in the non-circular shape increases in order to suppress an increase in the size of the apparatus. This will make achieving low-cost and light weight of the apparatus difficult.

Further, the projection-type display apparatus 200 equipped with the above projection lens 100 includes a light modulation unit for projection 300 provided with a light source 20, a light valve 11, an illumination optical unit that guides the rays of light emitted from the light source 20 to the light valve 11 and the like and the above projection lens 100. The projection-type display apparatus 200 optically modulates rays of light guided from the light source 20 through the light valve 11 on which an image G is formed, and enlarges and projects the image onto a screen 1 arranged on the conjugation surface Cpk on the magnification side through the projection lens 100.

As illustrated in FIG. 1, in this projection-type display apparatus 200, the rays of light provided with the image information representing the image G formed on the image-forming surface 11m of the light valve 11 is input to the projection lens 100 via various kinds of filters such as a low-pass filter and an infrared cut filter, a cover glass or a glass block (indicated by reference number 2ab in FIG. 1), and is enlarged to be projected on the screen 1 arranged on the conjugation surface Cpk on the magnification side by the projection lens 100.

In particular, as the above glass block, color composition means such as a cross dichroic prism, a prism for a DMD or a PBS for LCOS which separates the illumination light from the projection light can be arranged.

Further, the above projection-type display apparatus 200 may be a single panel type having only a single light valve 11 or may be a multiple panel type having a plurality of light valves 11.

Figure 8A:
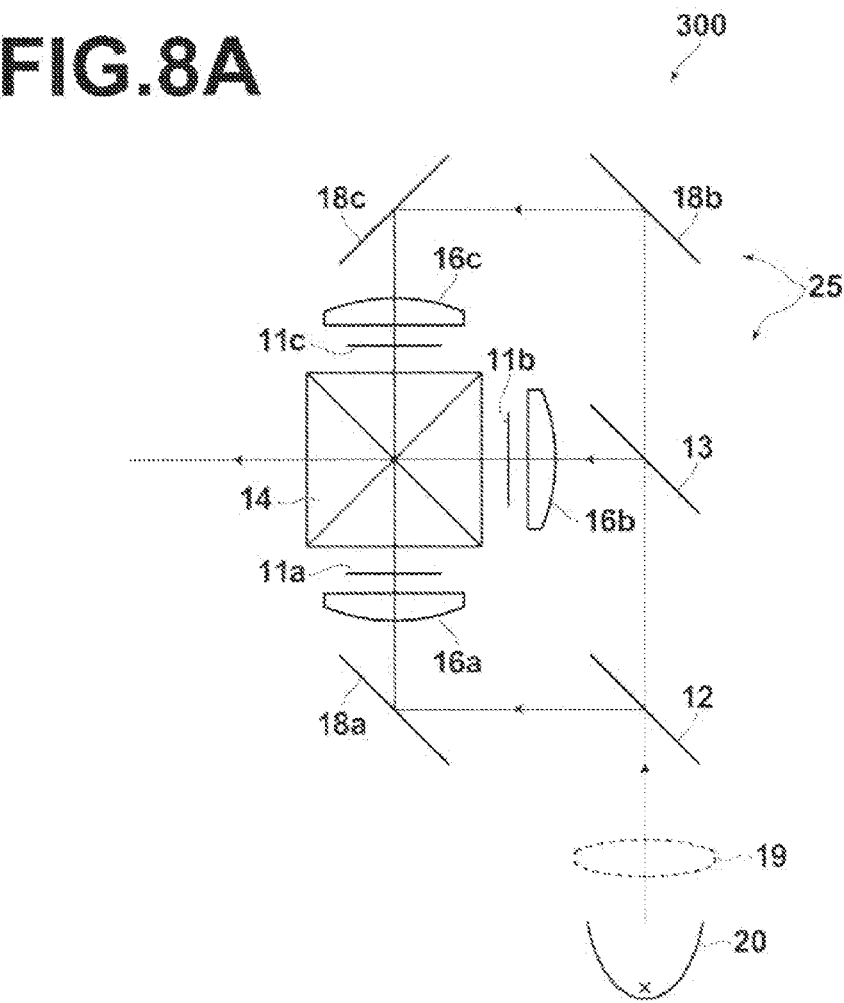
FIG. 8A is a cross sectional diagram illustrating a light modulation unit for projection of a three-panel type having three light valves.
Figure 8B:
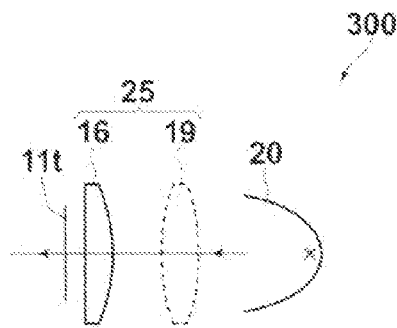
FIG. 8B is a cross sectional diagram illustrating a light modulation unit for projection of a single panel type having only a single light valve.

FIG. 8A is an enlarged figure illustrating a light modulation unit for projection of a three-panel type; and FIG. 8B is an enlarged figure illustrating a light modulation unit for projection of a single panel type.

As illustrated in FIG. 8A, in the case that the projection-type display apparatus 200 is a three-panel type, the light modulation unit for projection 300 can have a light source 20; a transmissive liquid crystal panels 11a, 11b, and 11c as a light valve; an illumination optical unit 25 which respectively guides the rays of light emitted from the light source 20 to the transmissive liquid crystal panels 11a through 11c; and a cross dichroic prism 14 which is a composition optical system for composing the rays of light passed through the transmissive liquid crystal panels 11a through 11c. The illumination optical unit 25 have an integrator 19 such as a fly-eye lens arranged between the light source 20 and a dichroic mirror 12.

The rays of white light emitted from the light source 20 pass through the illumination optical unit 25 to be separated into rays of light of three colors (G light, B light, and R light), and then individually enters the liquid crystal panels 11a through 11c which corresponds to each color to be subjected to the light modulation.

Each of the rays of light which has been subjected the light modulation through the liquid crystal panels 11a through 11c is further subjected to color composition by the cross dichroic prism, 14, and then is projected onto the screen 1 through the projection lens 100.

In this case, dichroic mirrors 12 and 13; total reflection mirrors 18a, 18b, and 18c; and condensing lenses 16a, 16b, and 16c are arranged in the illumination optical unit 25 of the light modulation unit 300.

The light modulation unit 300 is not limited to that described above which uses the transmissive liquid crystal display panels, and a reflective liquid crystal display panel or other light modulation units such as a DMD can be applied.

As illustrated in FIG. 8B, a liquid crystal panel 11t which is a light valve may be a single panel, and the light modulation unit for projection 300 may include a light source 20 composed of LED's that emit each of R, G, B colors, a single transmissive liquid crystal panel 11t, and an illumination optical unit 25 having a condensing lens 16 for guiding the rays of light emitted from the light source 20 to the transmissive liquid crystal panel 11t, in order to facilitate further miniaturization of the apparatus. The illumination optical unit 25 may have an integrator 19 such as a fly-eye arranged between the light source 20 and the dichroic mirror 12.

Images corresponding to each of R, G, B colors are sequentially displayed on a single transmissive liquid crystal panel 11t, and rays of light having corresponding colors are output from the light source 20 composed of the LED's of each of R, G, B colors in synchronization therewith. The rays of light of each of RGB colors are passed through the light optical unit 25 and are optically modulated in the liquid crystal panel, 11t, on which images synchronized with the emission of each of RGB colors are formed. Further, the rays of light carrying frame sequential color images which have been optically modulated through the liquid crystal panel 11t are enlarged and projected onto the screen 1 through the projection lens 100.

In such a manner, if a light valve is formed by a single pane the aforementioned dichroic mirrors for color separation 12 and 13; a cross dichroic prism for color composition 14; total reflection mirrors 18a through 18c; and the like can be omitted.

SPECIFIC EXAMPLES

Next, specific examples of the projection lens according to the present invention will be described. In the descriptions of the following examples, the same reference numerals are assigned to elements that have similar actions and effects, and the overlapped descriptions are omitted.

Example 1

Figure 2:
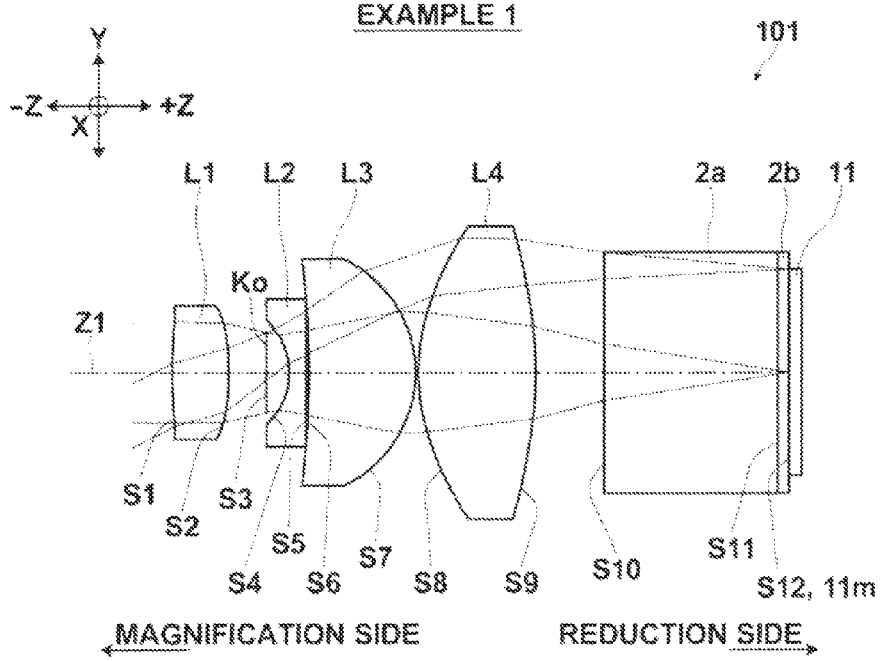
FIG. 2 is a schematic cross sectional diagram illustrating the structure of a projection lens in Example 1.

FIG. 2 is a schematic cross sectional diagram illustrating a projection lens of Example 1. The projection lens 101 of Example 1 is constituted by arranging a first lens L1 which is a double aspheric surface lens having a double convex shape on an optical axis Z; an aperture Ko; a second lens L2 which is a plano-concave lens having a concave surface on the magnification side; a third lens L3 which is a positive meniscus lens that is convex toward the reduction side; and a fourth lens L4 which is a double aspheric surface lens having a double convex shape on the optical axis Z, in this order from the magnification side.

In FIG. 2, a light modulation unit for projection is arranged on the reduction side of the projection lens 100. More specifically, a glass block 2a, a cover glass 2b, and a light valve 11 are arranged in order from the magnification side.

In the projection lens 101, the rays of light (the rays of light provided with image information) representing images formed on an image-forming surface 11m of the light valve 11 enters the projection lens through the cover glass 2b and the glass block 2a and are projected on the magnification side through this projection lens.

In the case that a projection-type display apparatus is constructed using a single light valve, the glass block 2a and the like can be omitted.

Further, the projection lens 101 is constructed in such a manner to satisfy the all of the above formulas (A) through (I), as shown in Table 4 to be described later.

The following Table 1 shows basic data about the projection lens 101 in Example 1. The upper part of Table 1 shows lens data. The lower part of Table 1 shows aspheric coefficients. In the lens data, the mark "*" attached to a surface number indicates that a surface represented by the surface number is an aspheric surface. The bottom, of the upper part of Table 1 shows a focal length (mm) of the entire lens system. In the lens data at the upper part of Table 1, radius $R_i$ of curvature represents the radius (mm) of curvature of the i-th surface (i=1, 2, 3, ... ). Distance $D_i$ between surfaces (i=1, 2, 3, ... ) represents a distance between the i-th surface and an (i+1)th surface on optical axis Z1. The sign $R_i$ and the sign $D_i$ in the lens data correspond to the sign $S_i$ (i=1, 2, 3, ... ), which represents a lens surface or the like.

Further, the sign $Nd_j$ represents the refractive index of a j-th (j=1, 2, 3, ... ) optical element with respect to wavelength of 587.6 nm (d-line). The most-magnification-side optical element (optical member) is the first optical element, and numbers sequentially increase toward the reduction side. Further, the sign $vd_j$ represents the Abbe number of the j-th optical element (optical member) based on the d-line.

The radius of curvature of a surface is positive when the surface is convex toward the magnification side, and negative when the surface is convex toward the reduction side.

TABLE 1

EXAMPLE 1

| SURFACE NUMBER Si | RADIUS OF CURVATURE Ri | DISTANCE Di | REFRACTIVE INDEX dj | ABBE NUMBER vj |
|---|---|---|---|---|
| OBJ (CONJUGATION SURFACE ON MAGNIFICATION SIDE) | ∞ | 650.00 | | |
| 1*(ASPHERIC SURFACE) | 14.62 | 1.97 | 1.6336 | 23.6 |
| 2*(ASPHERIC SURFACE) | −10.72 | 1.32 | | |
| 3 (APERTURE) | ∞ | 0.80 | | |
| 4 | −2.50 | 0.60 | 1.8467 | 23.8 |
| 5 | 0.00 | 0.10 | | |
| 6 | −32.99 | 3.72 | 1.7292 | 54.7 |
| 7 | −4.43 | 0.10 | | |
| 8*(ASPHERIC SURFACE) | 7.18 | 4.12 | 1.5101 | 56.2 |
| 9*(ASPHERIC SURFACE) | −13.44 | 2.37 | | |
| 10 | ∞ | 6.10 | 1.6385 | 55.4 |
| 11 | ∞ | 0.40 | 1.4875 | 70.2 |
| 12 (CONJUGATION SURFACE ON REDUCTION SIDE) | ∞ | | | |

ASPHERIC COEFFICIENT

| SURFACE NUMBER Si | K | A3 | A4 | A5 | A6 |
|---|---|---|---|---|---|
| 1* | 1.0000 | 0.0000E+00 | −2.0522E−05 | 0.0000E+00 | −2.1713E−03 |
| 2* | 1.0000 | 0.0000E+00 | −5.0189E−03 | 0.0000E+00 | 2.3076E−03 |
| 8* | 1.0000 | 0.0000E+00 | −5.5378E−04 | 1.3756E−04 | −7.2296E−05 |
| 9* | 1.0000 | 0.0000E+00 | 6.7181E−04 | −1.2216E−05 | −8.6767E−06 |

TABLE 1-continued

EXAMPLE 1

| | A7 | A8 | A9 | A10 | A11 | A12 |
|---|---|---|---|---|---|---|
| 1* | 1.0645E−03 | 1.2716E−04 | −2.0240E−04 | 2.7888E−05 | 0.0000E+00 | 0.0000E+00 |
| 2* | −1.9805E−03 | −1.0892E−04 | 4.5598E−04 | −1.0471E−04 | 0.0000E+00 | 0.0000E+00 |
| 8* | 1.0758E−05 | 1.1263E−06 | −3.4737E−07 | −4.5875E−08 | 1.2692E−08 | −4.1538E−10 |
| 9* | −4.0784E−06 | 7.7699E−07 | 1.5478E−07 | −2.5932E−08 | −9.1712E−09 | 1.5781E−09 |

※FOCAL DISTANCE OF THE ENTIRE LENS SYSTEM: 7.20

The aspheric coefficients represented in the lower part of Table 1 is prepared to be applied in the following aspheric equation to define aspheric shapes.

$$Z = \frac{Y^2/R}{1+(1-K\cdot Y^2/R^2)^{1/2}} + \sum_{i=3}^{n} Ai \cdot Y^i \quad \text{[Numerical Formula 1]}$$

where
Z: the depth of an aspheric surface (the length of a perpendicular from a point on an aspheric surface at height Y to a flat plane perpendicular to the optical axis in contact with the vertex of the aspheric surface) (mm)
Y: height (a distance from the optical axis) (mm)
R: a paraxial radius of curvature (mm)
K, Ai: aspheric coefficients (i=3 through n).

The lens data, the aspheric coefficients, and the like are read in the same manner as in each of the following Examples, and the description thereof will be omitted.

Example 2

Figure 3:
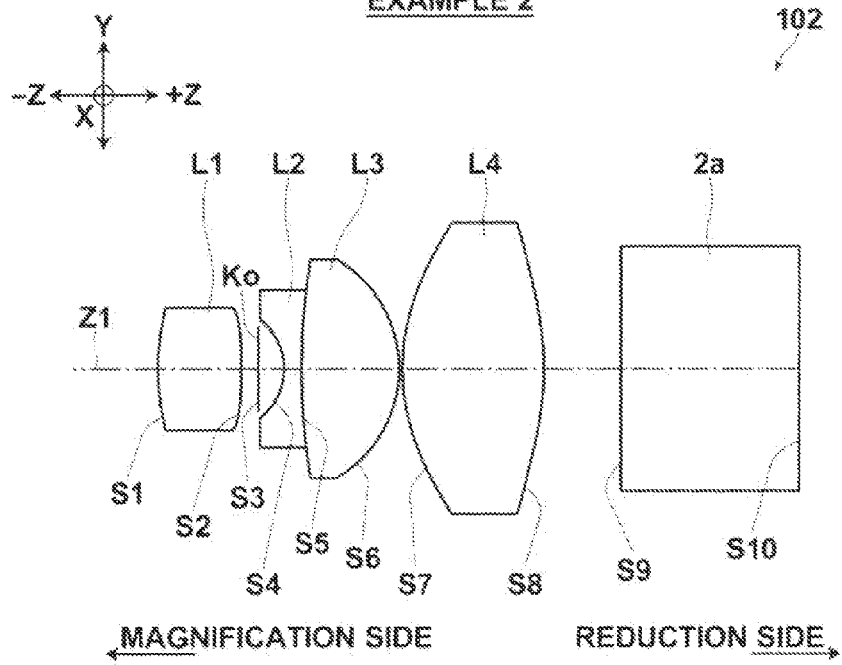
FIG. 3 is a schematic cross sectional diagram illustrating the structure of a projection lens in Example 2.

FIG. 3 is a cross-sectional view illustrating a projection lens of Example 2. The projection lens 102 of Example 2 is constituted by arranging a first lens L1 which is a double aspheric surface lens having a double convex shape on the optical axis Z; an aperture Ko; a second lens L2 which constitutes a lens on the magnification side in a cemented lens; a third lens L3 which constitutes a lens on the reduction side in a cemented lens; and a fourth lens L4 which is a double aspheric surface lens having a double convex shape on the optical axis Z, in order from the magnification side.

Further, FIG. 3 illustrates a state in which only a glass block 2a is arranged on the reduction side of the projection lens 102.

Further, as shown in Table 4 to be described later, the projection lens 102 is constructed in such a manner to satisfy all of the above formulas (A) through (I).

The following Table 2 shows basic data about the lens for projection 102 in Example 2. The upper part of Table 2 shows lens data. The lower part of Table 2 shows aspheric coefficients.

TABLE 2

EXAMPLE 2

| SURFACE NUMBER Si | RADIUS OF CURVATURE Ri | DISTANCE Di | REFRACTIVE INDEX dj | ABBE NUMBER vj |
|---|---|---|---|---|
| OBJ (CONJUGATION SURFACE ON MAGNIFICATION SIDE) | ∞ | 650.00 | | |
| 1*(ASPHERIC SURFACE) | 8.71 | 2.82 | 1.6336 | 23.6 |
| 2*(ASPHERIC SURFACE) | −26.17 | 0.57 | | |
| 3 (APERTURE) | ∞ | 0.90 | | |
| 4 | −2.14 | 0.60 | 1.8467 | 23.8 |
| 5 | 22.73 | 3.33 | 1.7725 | 49.6 |
| 6 | −4.38 | 0.10 | | |
| 7*(ASPHERIC SURFACE) | 6.97 | 4.86 | 1.5101 | 56.2 |
| 8*(ASPHERIC SURFACE) | −9.70 | 2.61 | | |
| 9 | ∞ | 6.10 | 1.6385 | 55.4 |
| 10 (CONJUGATION SURFACE ON REDUCTION SIDE) | ∞ | | | |

ASPHERIC COEFFICIENT

| SURFACE NUMBER Si | K | A3 | A4 | A5 | A6 |
|---|---|---|---|---|---|
| 1* | 1.0000 | 0.0000E+00 | 1.5026E−03 | 0.0000E+00 | −7.2914E−04 |
| 2* | 1.0000 | 0.0000E+00 | −3.9738E−03 | 0.0000E+00 | −1.8621E−03 |
| 7* | 1.0000 | 0.0000E+00 | −4.9174E−04 | 0.0000E+00 | −1.3047E−05 |
| 8* | 1.0000 | 0.0000E+00 | 9.9618E−04 | 0.0000E+00 | −9.6471E−06 |

| | A7 | A8 | A9 | A10 | A11 | A12 |
|---|---|---|---|---|---|---|
| 1* | 0.0000E+00 | 1.5000E−04 | 0.0000E+00 | −1.6788E−05 | 0.0000E+00 | 0.0000E+00 |
| 2* | 0.0000E+00 | 6.1335E−04 | 0.0000E+00 | −1.2238E−04 | 0.0000E+00 | 0.0000E+00 |
| 7* | 1.0378E−07 | 5.6222E−07 | 3.9970E−09 | −1.1084E−08 | 2.0392E−09 | −5.9369E−10 |
| 8* | −1.9894E−06 | 2.5470E−07 | 7.2949E−08 | 6.7227E−09 | 6.7573E−10 | −8.0647E−10 |

※FOCAL DISTANCE OF THE ENTIRE LENS SYSTEM: 7.15

Example 3

Figure 4:
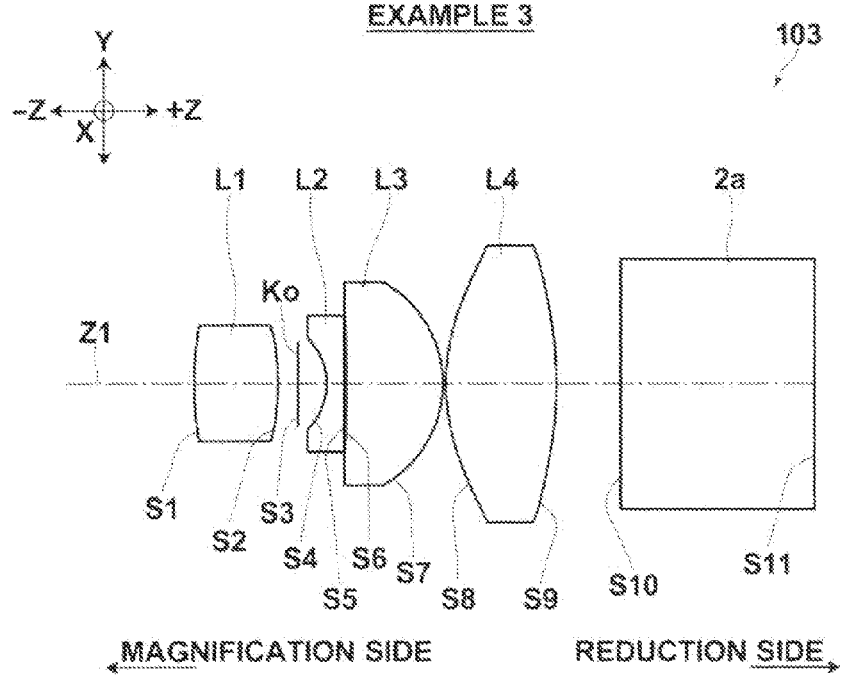
FIG. 4 is a schematic cross sectional diagram, illustrating the structure of a projection lens in Example 3.

FIG. 4 is a cross-sectional view illustrating a projection lens of Example 3. The projection lens 103 of Example 3 is constituted by arranging a first lens L1 which is a double aspheric surface lens having a double convex shape on the optical axis Z; an aperture Ko; a second lens L2 which is a negative meniscus lens having a concave surface toward the magnification side; a third lens L3 which is a positive meniscus lens having convex surface toward the reduction side; and a fourth lens L4 which is a double aspheric surface lens having a double convex shape on the optical axis Z, in order from the magnification side.

Further, FIG. 4 illustrates a state in which only a glass block 2a is arranged on the reduction side of the projection lens 103.

Further, as shown in Table 4 to be described later, the projection lens 102 is constructed in such a manner to satisfy all of the above formulas (A) through (I).

The following Table 3 shows basic data about the lens for projection 103 in Example 3. The upper part of Table 3 shows lens data. The lower part of Table 3 shows aspheric coefficients.

d-line, F-line and C-line are illustrated. In the diagrams illustrating lateral chromatic aberration, aberration curves of the F-line (dotted line: the same applies hereinafter) and the C-line (chain double-dashed line: the same applies hereinafter) with respect to the d-line are illustrated. As illustrated in FIGS. 5 through 8 (sic), each aberration such as distortion or lateral chromatic aberration is corrected in an excellent manner in the projection lenses of Examples 1 through 4.

The projection lens of the present invention is not limited to the aforementioned examples, and various modifications are possible. For example, the curvature radius R of each lens and a distance between lenses (or lens thickness) D may be changed in an appropriate manner.

Further, the structure of the projection-type display apparatus of the present invention is not limited to the aforementioned structure. The projection-type display apparatus including the projection lens of the present invention may be structured in various manners. For example, the light valve may be a transmissive or reflective liquid crystal display device, a micromirror device (for example, a digital micromirror device manufactured by Texas Instruments Incorpo-

TABLE 3

EXAMPLE 3

| SURFACE NUMBER Si | RADIUS OF CURVATURE Ri | DISTANCE Di | REFRACTIVE INDEX dj | ABBE NUMBER vj |
|---|---|---|---|---|
| OBJ (CONJUGATION SURFACE ON MAGNIFICATION SIDE) | ∞ | 650.00 | | |
| 1*(ASPHERIC SURFACE) | 11.40 | 2.85 | 1.6318 | 23.2 |
| 2*(ASPHERIC SURFACE) | −12.16 | 0.69 | | |
| 3 (APERTURE) | ∞ | 1.00 | | |
| 4 | −2.23 | 0.60 | 1.8467 | 23.8 |
| 5 | −255.53 | 0.10 | | |
| 6 | −39.84 | 3.26 | 1.7130 | 53.9 |
| 7 | −4.02 | 0.10 | | |
| 8*(ASPHERIC SURFACE) | 7.13 | 3.80 | 1.5101 | 56.2 |
| 9*(ASPHERIC SURFACE) | −12.28 | 2.18 | | |
| 10 | ∞ | 6.65 | 1.5163 | 64.1 |
| 11 (CONJUGATION SURFACE ON REDUCTION SIDE) | ∞ | | | |

ASPHERIC COEFFICIENT

| SURFACE NUMBER Si | K | A3 | A4 | A5 | A6 |
|---|---|---|---|---|---|
| 1* | 1.0000 | 0.0000E+00 | 9.9869E−04 | 0.0000E+00 | −8.9242E−04 |
| 2* | 1.0000 | 0.0000E+00 | −3.4793E−03 | 0.0000E+00 | −1.3030E−03 |
| 8* | 1.0000 | 0.0000E+00 | −3.5810E−04 | 0.0000E+00 | −2.7165E−05 |
| 9* | 1.0000 | 0.0000E+00 | 9.0945E−04 | 0.0000E+00 | −3.4104E−05 |

| | A7 | A8 | A9 | A10 | A11 | A12 |
|---|---|---|---|---|---|---|
| 1* | 0.0000E+00 | 1.8278E−04 | 0.0000E+00 | −1.9134E−05 | 0.0000E+00 | 0.0000E+00 |
| 2* | 0.0000E+00 | 4.6712E−04 | 0.0000E+00 | −8.2445E−05 | 0.0000E+00 | 0.0000E+00 |
| 8* | 0.0000E+00 | 1.1229E−06 | 0.0000E+00 | −3.3501E−08 | 0.0000E+00 | 0.0000E+00 |
| 9* | 0.0000E+00 | 8.1759E−07 | 0.0000E+00 | −2.0735E−08 | 0.0000E+00 | 0.0000E+00 |

※FOCAL DISTANCE OF THE ENTIRE LENS SYSTEM: 7.19

Figure 5:
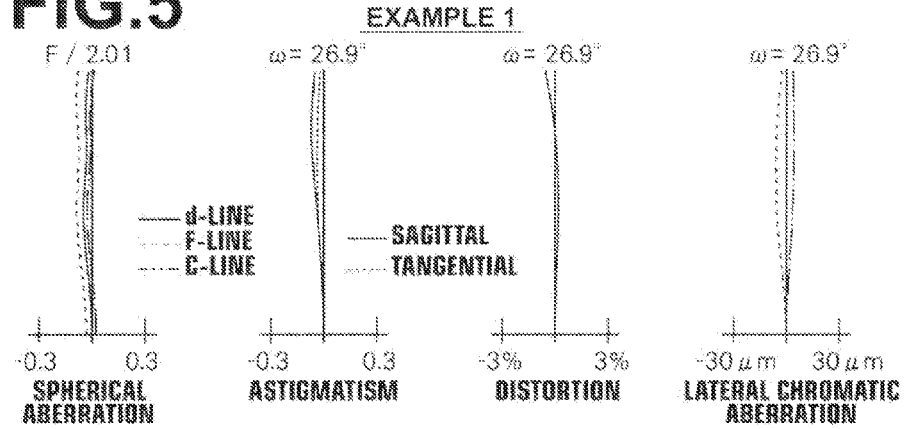
FIG. 5 is a diagram illustrating various aberrations of the projection lens in Example 1.
Figure 6:
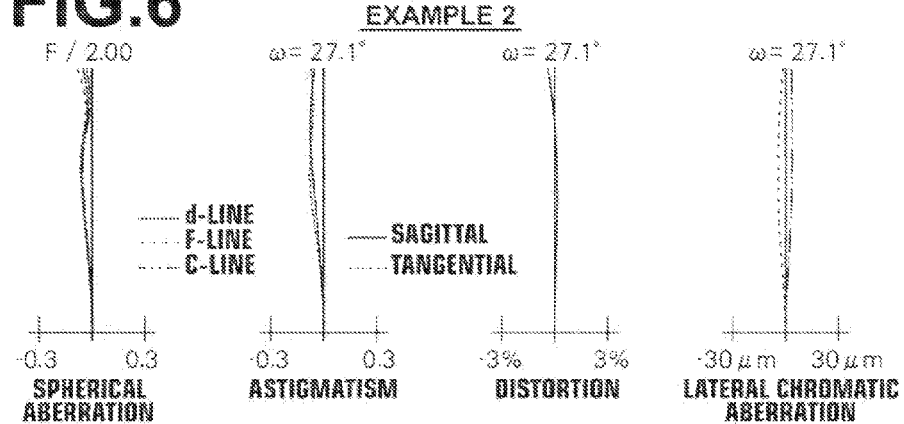
FIG. 6 is a diagram illustrating various aberrations of the projection lens in Example 2.
Figure 7:
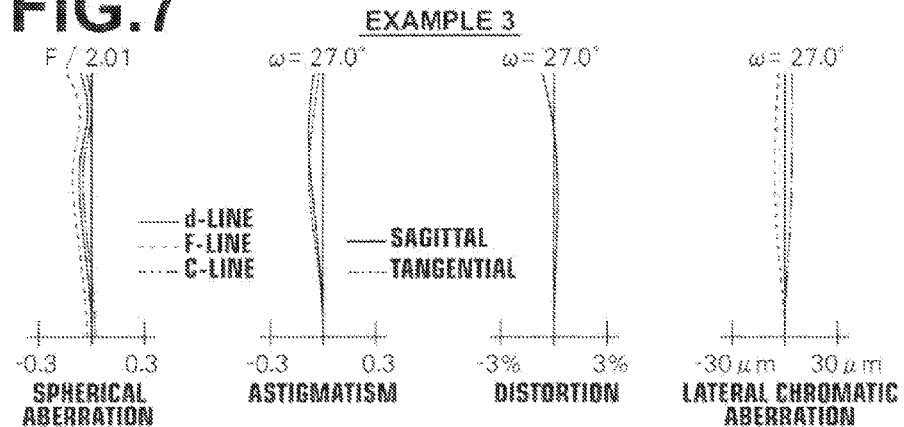
FIG. 7 is a diagram illustrating various aberrations of the projection lens in Example 3.

FIGS. 5 through 7 are diagrams illustrating various aberrations (spherical aberration, astigmatism, distortion, and lateral chromatic aberration, respectively) of the projection lenses in Examples 1 through 3. In the diagrams illustrating aberrations, ω represents a half angle of view. In the diagrams illustrating spherical aberration, aberration curves for the rated), or the like. The micromirror device includes a multiplicity of micro mirrors arranged on a substantially flat plane, and the inclination of each of the multiplicity of micro mirrors is changeable. Further, the structure of the illumination optical system may be adopted in an appropriate manner based on the type of the light valve.

TABLE 4

|  | FORMULA (A) NUMERICAL FORMULA: VALUE OF Bf/f | FORMULA (B) NUMERICAL FORMULA: VALUE OF f1/f | FORMULA (C) VALUE OF Nd1 | FORMULA (D) VALUE OF vd1 | FORMULA (E) VALUE OF Nd4 |
|---|---|---|---|---|---|
| EXAMPLE 1 | 0.88 | 1.40 | 1.6336 | 23.6 | 1.5101 |
| EXAMPLE 2 | 0.89 | 1.49 | 1.6336 | 23.6 | 1.5101 |
| EXAMPLE 3 | 0.91 | 1.36 | 1.6318 | 23.2 | 1.5101 |

|  | FORMULA (F) VALUE OF vd4 | FORMULA (G) NUMERICAL FORMULA: VALUE OF S/OBJ | FORMULA (H) NUMERICAL FORMULA: VALUE OF β/S | FORMULA (I) VALUE OF IH | FORMULA (I) VALUE OF TH |
|---|---|---|---|---|---|
| EXAMPLE 1 | 56.2 | 30.6 | 4.5 | 3.64 | 3.58 |
| EXAMPLE 2 | 56.2 | 30.8 | 4.5 | 3.64 | 3.47 |
| EXAMPLE 3 | 56.2 | 30.7 | 4.5 | 3.64 | 3.50 |

What is claimed is:

1. A projection lens which is telecentric on a reduction side, which enlarges and projects images formed on a conjugation surface on the reduction side onto a conjugation surface on a magnification side, comprising only:

a first lens having a positive power and at least one surface that is an aspheric surface;

a second lens having a negative power and having a concave surface on the magnification side;

a third lens having a positive power and having a convex surface on the reduction side; and a fourth lens having a positive power, which are arranged in order from the magnification side, wherein the following formulas (A), (B), (C), and (D) are simultaneously satisfied:

$$0.8 < Bf/f \quad (A);$$

$$1.1 < f1/f < 1.6 \quad (B);$$

$$Nd1 < 1.7 \quad (C); \text{ and}$$

$$vd1 < 35 \quad (D), \text{ where}$$

Bf: air conversion back focus on the reduction side
f: focal length of the entire lens system
f1: focal length of the first lens
Nd1: refractive index of the first lens, and
vd1: Abbe number of the first lens.

2. The projection lens, as defined in claim 1, wherein the fourth lens has at least one surface that is an aspheric surface and the contour of the outer periphery of the fourth lens is non-circular shape, and the following formulas (E) and (F) are satisfied at the same time:

$$Nd4 < 1.6 \quad (E); \text{ and}$$

$$40 < vd4 \quad (F), \text{ where}$$

Nd4: refractive index, and
vd4: Abbe number of the fourth lens.

3. The projection lens, as defined in claim 2, wherein the following formula (E') is satisfied:

$$1.4 < Nd4 < 1.6 \quad (E').$$

4. The projection lens, as defined in claim 2, wherein the following formula (F') is satisfied:

$$50 < vd4 \quad (F').$$

5. The projection lens, as defined in claim 2, wherein the following formula (F") is satisfied:

$$40 < vd4 < 85 \quad (F'').$$

6. The projection lens, as defined in claim 2, wherein an aperture which restricts the range through which rays of light emitted from the conjugation surface on the reduction side pass therethrough, is provided between the first lens and the second lens.

7. The projection lens, as defined in claim 2, wherein the following formulas (G) and (H) is satisfied at the same time:

$$20 < S/OBJ < 65 \quad (G); \text{ and}$$

$$2.5 < \beta/s < 10.0 \quad (H), \text{ where}$$

S: the maximum length (inch) of images to be projected onto the conjugation surface on the magnification side, OBJ: projection distance (m) to the images to be projected onto the conjugation surface on the magnification side, and β: magnification factor of the images to be projected onto the conjugation surface on the magnification side.

8. A projection-type display apparatus comprising:
a light source;
a light valve;
an illumination optical unit that guides rays output from the light source to the light valve; and
a projection lens, as defined in claim 2, wherein the rays output from the light source are optically modulated by the light valve and the optically modulated rays are projected through the projection lens.

9. The projection-type display apparatus, as defined in claim 8, wherein the display apparatus is a single panel type display apparatus equipped with only a single light valve.

10. The projection lens, as defined in claim 1, wherein an aperture which restricts the range through which rays of light emitted from the conjugation surface on the reduction side pass therethrough, is provided between the first lens and the second lens.

11. The projection lens, as defined in claim 10, wherein the following formulas (G) and (H) is satisfied at the same time:

$$20 < S/OBJ < 65 \quad (G); \text{ and}$$

$$2.5 < \beta/S < 10.0 \quad (H), \text{ where}$$

S: the maximum length (inch) of images to be projected onto the conjugation surface on the magnification side, OBJ: projection distance (m) to the images to be projected onto the conjugation surface on the magnification side, and β: magnification factor of the images to be projected onto the conjugation surface on the magnification side.

12. The projection lens, as defined in claim 1, wherein the following formulas (G) and (H) is satisfied at the same time:

$$20<S/OBJ<65 \tag{G); and}$$

$$2.5<\beta/S<10.0 \tag{H), where}$$

S: the maximum length (inch) of images to be projected onto the conjugation surface on the magnification side, OBJ: projection distance (m) to the images to be projected onto the conjugation surface on the magnification side, and β: magnification factor of the images to be projected onto the conjugation surface on the magnification side.

13. The projection lens, as defined in claim 12, wherein the following formula (I) is satisfied:

$$IH>TH \tag{I), where}$$

IH: the maximum height of light beams on the conjugation surface on the reduction side, and TH: the maximum height of effective rays of light of lenses other than the lens arranged closest to the reduction side.

14. The projection lens, as defined in claim 1, wherein the following formula (A') is satisfied:

$$0.8<Bf/f<1.2 \tag{A'}.$$

15. The projection lens, as defined in claim 1, wherein the following formula (B') is satisfied:

$$0.8<Bf/f<1.5 \tag{B'}.$$

16. The projection lens, as defined in claim 1, wherein the following formula (C') is satisfied:

$$1.5<Nd1<1.7 \tag{C'}.$$

17. The projection lens, as defined in claim 1, wherein the following formula (D') is satisfied:

$$vd1<30 \tag{D'}.$$

18. The projection lens, as defined in claim 1, wherein the following formula (D") is satisfied:

$$17<vd1<35 \tag{D"}.$$

19. A projection-type display apparatus comprising:
a light source;
a light valve;
an illumination optical unit that guides rays output from the light source to the light valve; and
a projection lens, as defined in claim 1, wherein the rays output from the light source are optically modulated by the light valve and the optically modulated rays are projected through the projection lens.

20. The projection-type display apparatus, as defined in claim 19, wherein the display apparatus is a single panel type display apparatus equipped with only a single light valve.

* * * * *